United States Patent
Hall et al.

(10) Patent No.: US 10,384,981 B2
(45) Date of Patent: Aug. 20, 2019

(54) METHODS OF FORMING CERAMIC MATRIX COMPOSITES USING SACRIFICIAL FIBERS AND RELATED PRODUCTS

(71) Applicant: General Electric Company, Schenectady, NY (US)

(72) Inventors: David Bruce Hall, Ballston Lake, NY (US); James Joseph Murray, Piedmont, SC (US); Jason Robert Parolini, Greer, SC (US); Michael Alan Vallance, Loudonville, NY (US); Juan Borja, Latham, NY (US); Daniel George Norton, Niskayuna, NY (US); Jared Hogg Weaver, Clifton Park, NY (US); Daniel Gene Dunn, Guilderland, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/622,210

(22) Filed: Jun. 14, 2017

(65) Prior Publication Data
US 2018/0362413 A1    Dec. 20, 2018

(51) Int. Cl.
*C04B 35/64* (2006.01)
*C04B 35/80* (2006.01)
(Continued)

(52) U.S. Cl.
CPC .......... *C04B 35/806* (2013.01); *C04B 35/117* (2013.01); *C04B 35/14* (2013.01); *C04B 35/18* (2013.01); *C04B 35/44* (2013.01); *C04B 35/5603* (2013.01); *C04B 35/563* (2013.01); *C04B 35/5622* (2013.01); *C04B 35/573* (2013.01); *C04B 35/584* (2013.01);
(Continued)

(58) Field of Classification Search
CPC ....... D06M 10/10; D06M 15/37; B29B 11/16; C04B 35/83; C04B 35/185; C04B 35/195; C04B 35/478; C04B 35/62873; C04B 35/62886; C04B 41/009; C04B 41/0072; C04B 41/4515; C04B 41/4529; C04B 41/4531
See application file for complete search history.

(56) References Cited

U.S. PATENT DOCUMENTS 4,766,013 A * 8/1988 Warren ................. C04B 35/806
                                                           423/447.1
6,547,967 B1 * 4/2003 Adler .................... B01D 53/885
                                                           210/500.25

(Continued)

*Primary Examiner* — Noah S Wiese
(74) *Attorney, Agent, or Firm* — Christopher R. Carroll; The Small Patent Law Group LLC (57) ABSTRACT

Methods for preparing ceramic matrix composites using melt infiltration and chemical vapor infiltration are provided as well as the resulting ceramic matrix composites. The methods and products include the incorporation of sacrificial fibers to provide improved infiltration of the fluid infiltrant. The sacrificial fibers are removed, such as decomposed during pyrolysis, resulting in the formation of regular and elongate channels throughout the ceramic matrix composite. Infiltration of the fluid infiltrant can then take place using the elongate channels resulting in improved density and an improved ceramic matrix composite product.

19 Claims, 6 Drawing Sheets

(51) Int. Cl.
  *C04B 35/628* (2006.01)
  *C04B 35/657* (2006.01)
  *C04B 35/117* (2006.01)
  *C04B 35/14* (2006.01)
  *C04B 35/18* (2006.01)
  *C04B 35/44* (2006.01)
  *C04B 35/56* (2006.01)
  *C04B 35/563* (2006.01)
  *C04B 35/573* (2006.01)
  *C04B 35/58* (2006.01)
  *C04B 35/584* (2006.01)
  *C04B 35/83* (2006.01)

(52) U.S. Cl.
  CPC .. *C04B 35/58085* (2013.01); *C04B 35/62878* (2013.01); *C04B 35/64* (2013.01); *C04B 35/657* (2013.01); *C04B 35/803* (2013.01); *C04B 35/83* (2013.01); *C04B 2235/524* (2013.01); *C04B 2235/5212* (2013.01); *C04B 2235/5224* (2013.01); *C04B 2235/5228* (2013.01); *C04B 2235/5232* (2013.01); *C04B 2235/5244* (2013.01); *C04B 2235/5248* (2013.01); *C04B 2235/5252* (2013.01); *C04B 2235/5264* (2013.01); *C04B 2235/5296* (2013.01); *C04B 2235/614* (2013.01); *C04B 2235/616* (2013.01); *C04B 2235/728* (2013.01); *C04B 2235/80* (2013.01)

(56) References Cited

U.S. PATENT DOCUMENTS

| | | |
|---|---|---|
| 7,186,360 B2 * | 3/2007 | Benitsch ............... C04B 35/573 264/136 |
| 7,297,368 B2 | 11/2007 | Williams et al. |
| 8,986,599 B2 | 3/2015 | Okoli et al. |
| 2006/0163773 A1 | 7/2006 | Gray |
| 2012/0156466 A1 * | 6/2012 | Bell ................... C04B 35/62204 428/297.4 |
| 2013/0248305 A1 * | 9/2013 | Choi ..................... F16D 65/12 188/218 XL |
| 2014/0161626 A1 | 6/2014 | Podgorski et al. |
| 2014/0255665 A1 | 9/2014 | Hillier et al. |
| 2016/0060115 A1 * | 3/2016 | La Forest ............ D06M 10/10 427/227 |
| 2016/0102023 A1 * | 4/2016 | La Forest ............ B23K 26/364 428/155 |

* cited by examiner

METHODS OF FORMING CERAMIC MATRIX COMPOSITES USING SACRIFICIAL FIBERS AND RELATED PRODUCTS

Methods of making ceramic matrix composites are generally provided, along with products made by such methods. In particular, ceramic matrix composite products formed by melt infiltration (MI) or by chemical vapor infiltration (CVI).

BACKGROUND

Ceramic matrix composites ("CMCs") have high temperature capability and are light weight. The composites are thus an attractive material for various applications, such as for components in gas turbine engines where temperature durability and weight are important considerations. Current methods of preparing CMC products involve forming a laminate of ceramic fiber and matrix, thermally treating the laminate, applying an infiltrant to the laminate, and densifying the laminate. The densified laminate may then be machined to prepare a CMC product with the desired dimensions. Alternatively, woven preforms can be used instead of laminates.

The infiltrant may or may not react with one or more constituents in the preform. For example, during infiltration of molten silicon into a carbon containing preform, the silicon and carbon can react to form silicon carbide. In this case, the volume of silicon carbide formed from this reaction is greater than the volume of carbon that was consumed. The result is that the pore structure that transports silicon through the preform is reduced by this reaction. In the extreme case, the pores can close completely and choke off infiltration. In the case of chemical vapor infiltration ("CVI"), the reaction product of the infiltrating gases deposits on the surface of the pores, thereby reducing the amount of porosity. To successfully infiltrate a preform, the infiltrating fluid should have a percolated path to the infiltration front. This is balanced by the desire to have a fully dense product with a controlled amount of unreacted infiltrant or residual porosity. In melt infiltrated ("MI") CMCs, judicious selection of reactant particle size, reactant volume fraction, volume fraction of non-reactive preform constituents, pore volume fraction, and reaction stoichiometry is the typical route for maximizing part densification and controlling the final part composition including the amount of unreacted infiltrant. In CVI CMCs, judicious control of pore size and distribution is the typical route for maximizing densification and minimizing residual porosity.

Infiltration of thick preforms is especially challenging when infiltration pathways, such as pores, seal up or choke-off prematurely lowering the overall permeability. For both CVI and MI CMC materials, successful infiltration of thin, small preforms often does not translate well to thicker, larger preforms. In small parts, the infiltration distance is relatively short, such that a part may be fully infiltrated over a reasonable time scale even if the permeability of the matrix becomes low during infiltration. In larger, thicker parts, the infiltration distance is long and often the infiltrant does not reach the more inner areas of the preform. Permeability from the reacted or deposited matrix material may be too low, such as so low as to arrest infiltration completely, resulting in a defective part.

In some ply based MI CMCs, the primary route for infiltrant transport to the reaction front may be channeled elongate porosity remaining between plies after compaction of laminated tapes. Control of the size, shape, and number of these channels in a way that is reproducible is challenging. Variations in tape cured ply thickness, roughness, and autoclave compaction all contribute to variability in the size, shape, and number of these channels. Further, if these voids are still present in the final composite structure, the product may be considered defective.

Thus, an improved method of preparing ceramic matrix composites, particularly using melt infiltration or chemical vapor infiltration, is desirable in the art.

BRIEF DESCRIPTION

Aspects and advantages of the invention will be set forth in part in the following description, or may be obvious from the description, or may be learned through practice of the invention.

Methods are generally provided for forming a ceramic matrix composite (CMC) product, along with the resulting products formed from such methods. In one embodiment, the method includes: forming a CMC preform comprising a slurry, reinforcing fibers, and sacrificial fibers, removing the sacrificial fibers forming elongate channels throughout the CMC preform; and applying a fluid infiltrant to the CMC preform thereby densifying the CMC preform and forming the CMC product. In one embodiment, the CMC product may include a ceramic matrix, a plurality of ceramic reinforcing fibers disposed throughout the ceramic matrix, and one or more infiltrant veins traversing the CMC product.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Repeat use of reference characters in the present specification and drawings is intended to represent the same or analogous features or elements of the embodiment shown.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the "average particle diameter" or "average fiber diameter" refers to the diameter of a particle or fiber such that about 50% of the particles or fibers have a diameter that is greater than that diameter, and about 50% of the particles or fibers have a diameter that is less than that diameter.

As used herein, "substantially" refers to at least about 90% or more of the described group. For instance, as used herein, "substantially all" indicates that at least about 90% or more of the respective group have the applicable trait and "substantially no" or "substantially none" indicates that at least about 90% or more of the respective group do not have the applicable trait. As used herein, the "majority" refers to at least about 50% or more of the described group. For instance, as used herein, "the majority of" indicates that at least about 50% or more of the respective group have the applicable trait.

A ceramic matrix composite product (a "CMC product"), particularly a ceramic matrix composite product formed from melt or chemical vapor infiltration, is generally provided herein, along with methods of forming such product. The CMC product is formed using sacrificial fibers that create elongated channels in the CMC preform for infiltration of a fluid infiltrant, either gas or liquid, and thereby provide regular and fixed paths for the infiltrant to move to the reaction front. The sacrificial fibers allow for an improved product with increased density and increased saturation by the infiltrant. The resulting product has an overall improved composition.

The present CMC product and method of preparing the same use sacrificial fibers to introduce elongate channels of desired diameter, spacing, and location into a CMC preform. The sacrificial fibers may then be removed thermally (e.g., melting, vaporizing, and/or decomposing) or chemically (e.g., dissolving into a solvent and/or chemical etching). In one embodiment, for example, the sacrificial fibers can be thermally decomposed to give porous elongate channels within the part. The diameter, position, volume fraction, and length of the sacrificial fibers as disclosed herein can provide the desired size, shape, and distribution of porous channels within the part. One or more sacrificial fibers may be used. One can thus maximize the probability of infiltration success, while also minimizing any reduction in mechanical/thermal properties in a controlled manner.

The elongate channels formed from the sacrificial fibers increase permeability, in a controlled manner, to improve infiltration in the preform. As used herein, "elongate" refers to a body with an aspect ratio (length/width) of greater than 1. The use of the sacrificial fibers can be particularly beneficial for preforms requiring long infiltration distances to ensure complete infiltration. The sacrificial fibers may be introduced in the tape making and/or layup process of the product manufacturing process, and can be generally cylindrical bodies or have other shapes. In certain embodiments, the sacrificial fibers are resistant to any solvent present in the tape making process and are able to survive autoclave conditions (for example, temperatures of about 200° C. or less, such as about 50° C. to about 200° C.). In one embodiment, the sacrificial fibers decompose or pyrolyze to form porous elongate channels within the preform, such as under decomposition conditions at temperatures such as about 200° C. to about 650° C. However, in other embodiments, the sacrificial fibers may be removed by other thermal methods (e.g., melting, vaporizing, etc.) or chemical methods (e.g., dissolving into a solvent and/or chemical etching).

The elongate channels formed from the sacrificial fibers may also provide a pathway for gas to escape during the infiltration process. Gas may evolve from preforms at infiltration temperatures. If the gas does not have a way to escape, pressure can build in the preform, which may result in bubbles or other voids/pockets in the resulting CMC. The sacrificial fibers of the present disclosure may prevent the increase in pressure by providing a path for gas to escape the preform.

The sacrificial fibers may be introduced during the tape making or, alternatively, in the lay-up process. The sacrificial fibers may be disposed as single strands, woven or nonwoven mats, continuous grids (e.g., continuous in two dimensions and a single layer), or various other configurations as well as combinations thereof. The sacrificial fibers are generally resistant to solvents present in the tape making process and have enough thermal integrity to resist flow during the autoclave process. The sacrificial fibers also generally do not decompose at temperatures present in the autoclave process; however, the sacrificial fibers do decompose during the burnout process prior to melt or chemical vapor infiltration. The composition of the sacrificial fibers may be chosen to target a specific char yield to provide the desired structure of the elongate channels. For example, in some embodiments, it may be desired to have some degree of scaffolding in the elongate channels, thus, a polymer with a higher char yield may be used to form the sacrificial fibers. In other embodiments, it may be desired to have uniform elongate channels, thus, a polymer with a lower char yield may be used to form the sacrificial fibers.

Solvent and temperature resistance may be imparted through the use of a semi-crystalline polymer fiber with an elevated melting point, through the use of a cross-linked polymer fiber, through the judicious choice of the composition of an amorphous polymer or polymer blend, through use of combinations thereof, or through other modifications to provide the desired elongate channels and resulting CMC product. For instance, the sacrificial fibers may include crosslinked phenolic resin (e.g., Kynol®), which may have a decomposition temperature of about 600° C. and a char yield of about 55% to about 60%; crosslinked poly(vinyl butyral); polyamides such as nylon 6,6, which may have a melting temperature of about 265° C., a decomposition temperature of about 400° C., and a char yield of about 1.5%; polyester fiber, which may have a melting temperature of about 250° C., a decomposition temperature of about 400° C., and a char yield of about 20%; and combinations thereof.

CMC preforms may be prepared with a slurry that includes reinforcing fibers and sacrificial fibers. The slurry may also include one or more solvents, particulates, or other suitable materials. The preform may undergo autoclaving followed by pyrolysis and decomposition of the sacrificial fibers. An infiltrant may then be added to densify the CMC preform and form the CMC product. With the incorporation of the sacrificial fibers and subsequent formation of elongate channels from decomposition of the sacrificial fibers, the infiltrant is able to infiltrate the preform through the elongate channels forming a more uniform and dense product. Infiltrant veins may be present along the product indicating the use of sacrificial fibers to form elongate channels for the infiltrant to infiltrate the preform. For instance, in the case of melt infiltration, infiltrant veins comprising unreacted infiltrant may be present along the CMC product indicating that sacrificial fibers were used for infiltration. In the case of chemical vapor infiltration, infiltrant veins comprising a shell and a porous core may be seen along the CMC product indicating the use of sacrificial fibers when forming the CMC product.

The present method can be used to prepare a variety of components comprising ceramic matrix composites. For instance, the present method may be used to prepare components in the aviation industry. The present method may be used to prepare components for gas turbine engines, such as in high pressure compressors (HPC), fans, boosters, high pressure turbines (HPT), and low pressure turbines (LPT) of both airborne and land-based gas turbine engines. For instance, the present method may be used to prepare components for a turbofan engine or turbomachinery in general, including turbojet, turboprop and turboshaft gas turbine engines, including industrial and marine gas turbine engines and auxiliary power units. For instance, components such as combustion liners, shrouds, nozzles, blades, etc. may be prepared with the present method and materials.

CMC materials of particular interest to the invention are silicon-containing, or oxide containing matrix and reinforcing materials. Some examples of CMCs acceptable for use herein can include, but are not limited to, materials having a matrix and reinforcing fibers comprising non-oxide silicon-based materials such as silicon carbide, silicon nitride, silicon oxycarbides, silicon oxynitrides, silicides, and mixtures thereof. Examples include, but are not limited to, CMCs with a silicon carbide matrix and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics. Specifically, the oxide-oxide CMCs may be comprised of a matrix and reinforcing fibers comprising oxide-based materials such as aluminum oxide ($Al_2O_3$), silicon dioxide ($SiO_2$), yttrium aluminum garnet (YAG), aluminosilicates, and mixtures thereof. Aluminosilicates can include crystalline materials such as mullite ($3Al_2O_3$ $2SiO_2$), as well as glassy aluminosilicates. Other ceramic composite materials that are not comprised of either silicon or oxygen may be used, including carbon, zirconium carbide, hafnium carbide, boron carbide, or other ceramic materials, alone or in combination with the materials noted above.

FIGS. 1a-1e are schematic views of an exemplary method of forming a CMC product in accordance with one embodiment of the present disclosure. In particular, FIGS. 1a-1e illustrate various stages of forming a CMC product in accordance with one embodiment of the present disclosure. Various combinations of these stages may be performed and not all of the stages may be performed in the method.

Figure 1A:
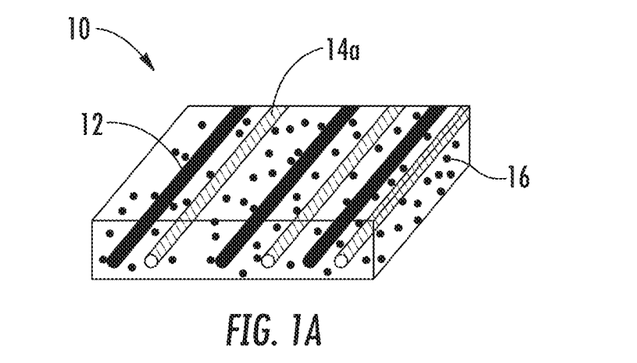
FIG. 1A is a schematic view of a CMC preform after forming with a slurry in accordance with one embodiment of the present disclosure.

FIG. 1a illustrates a CMC preform 10 after forming with a slurry 16. The CMC preform 10 includes reinforcing fibers 12, sacrificial fibers 14a, and a slurry 16. The CMC preform 10 illustrated in FIG. 1a is a unidirectional ply (e.g., the reinforcing fibers within each ply are generally disposed in a parallel direction relative to each other). When substantially all of the reinforcing fibers 12 within a single ply are disposed in a parallel direction relative to each other, the ply may be referred to as "unidirectional." In some embodiments, at least one reinforcing fiber 12 in each layer is disposed in a perpendicular direction relative to another reinforcing fiber 12 within the respective layer. When substantially all of the reinforcing fibers 12 within a single ply are disposed in a parallel direction or a perpendicular direction such that the fibers are woven, the ply may be referred to as "cross-woven." Multiple layers or "plies" may be used with each ply oriented in various directions (e.g., third, fourth, and fifth directions, etc.). For instance, a first ply may have reinforcing fibers oriented in a first direction and a second ply may have reinforcing fibers oriented in a second direction. The first direction may be positioned in any orientation with respect to the second direction, such as about 0° to about 90°, such as about 45°. While FIGS. 1a-1e show an embodiment with a unidirectional ply, the present method and materials can be used with a single unidirectional, cross-woven, or nonwoven ply, or multiple unidirectional, cross-woven, and/or nonwoven plies with plies layered in a variety of orientations, or in a multidirectional weave or braid. As used herein, "nonwoven" generally refers to the unordered disposition of fibers such as in a web with fibers disposed in a variety of orientations and configuration. Various configurations can be used without deviating from the intent of the present disclosure.

The reinforcing fibers 12 may be any suitable fibers that provide reinforcement for the resulting CMC product and may comprise any of the CMC materials set forth herein. The reinforcing fibers 12 may be more specifically referred to as ceramic reinforcing fibers 12. While in the embodiment illustrated in FIGS. 1a-1e the reinforcing fibers 12 may generally be comprised of the same material, the reinforcing fibers 12 of a single ply may vary in composition and/or the reinforcing fibers 12 may vary in composition across multiple plies.

In certain embodiments, the reinforcing fibers 12 may have at least one coating thereon. In particular embodiments, the at least one coating can have a layer selected from the group consisting of a nitride layer (e.g., a silicon nitride layer), a carbide layer (e.g., a silicon carbide layer), a boron layer (e.g., a boron nitride layer), a carbon layer, and combinations thereof. For example, the at least one coating can be deposited as a coating system selected from the group consisting of a nitride coating and a silicon carbide coating; a boron nitride, a carbide, and a silicon nitride coating system; a boron nitride, a silicon carbide, a carbide, and a silicon nitride coating system; a boron nitride, a carbon, a silicon nitride and a carbon coating system; and a carbon, a boron nitride, a carbon, a silicon nitride, and a carbon coating system; and mixtures thereof. If present, the coating thickness can be about 0.1 micrometer (μm) to about 4.0 μm.

The reinforcing fibers 12 are generally continuous in a single ply. That is, each reinforcing fiber 12 is generally a continuous strand across the ply as opposed to fragments of fibrous material. The reinforcing fibers 12 may have any suitable diameter or length to provide the desired ceramic product. In some embodiments, the reinforcing fibers 12 may have a diameter of about 5 μm to about 20 μm, such as about 7 μm to about 14 μm. In some embodiments, the reinforcing fibers 12 may be considered monofilaments and have an average diameter of about 125 μm to about 175 μm, such as about 140 μm to about 160 μm.

The slurry 16 may include various components such as one or more solvents, particulates (e.g., silicon, polymers), and combinations thereof. For instance, the slurry 16 may include various matrix precursor materials of the CMC materials set forth herein. In some embodiments, it may be beneficial to include surfactants, dispersing agents, and/or other components in the slurry, as well as matrix precursor material for the ceramic matrix.

In particular embodiments, the sacrificial fibers 14a may include any suitable fibers that are stable in the slurry 16, can withstand compression and heating, and decompose during the decomposition/pyrolysis stage. In some embodiments, the sacrificial fibers 14a should have a decomposition temperature or melting point at or lower than the temperature at which decomposition/pyrolysis is performed. For instance, the sacrificial fibers 14a may have a decomposition temperature of about 200° C. to about 700° C., such as about 200° C. to about 600° C., or about 400° C. to about 600° C. Suitable materials for the sacrificial fibers 14a may include polymers such as semi-crystalline polymers, cross-linked polymers, amorphous polymers, or combinations thereof, such as crosslinked phenolic resin, crosslinked poly(vinyl butyral), polyamides, polyesters, and combinations thereof. In certain embodiments, low melting point metals or reactive metals that can be etched via liquid or gases may be used as the sacrificial fibers 14a alone or in combination with any of the aforementioned sacrificial materials. While in the embodiment illustrated in FIGS. 1a-1e the sacrificial fibers 14a may generally be comprised of the same material, the sacrificial fibers 14a of a single ply may vary in composition and/or the sacrificial fibers 14a may vary in composition across multiple plies. The sacrificial fibers 14a are generally continuous in a single ply. That is, each sacrificial fibers 14a is generally a continuous strand across the ply as opposed to fragments of fibrous material. In other embodiments, it may be desired to form sacrificial fibers 14a of both continuous strands and fragments, while in other embodiments it may be desired to form sacrificial fibers 14a of fragments only.

Experimental and microstructural modeling studies both have indicated the importance of channels, such as channels about 10 μm to about 100 μm in diameter, in supplying infiltrants, such as silicon, to the reaction front in composite parts, particularly thick composite parts. If there are too many channels or the channels are too large, the resulting infiltrant veins may reduce the mechanical and thermal properties of the part. To maximize the probability of infiltration success, while minimizing any mechanical/thermal property reduction, the size and distribution of the channels can be controlled as described herein.

For example, in some embodiments, a single sacrificial fiber may be used to deliver infiltrant to a particularly difficult to infiltrate area, while in other embodiments, such as larger parts with significant infiltrant delivery issues, more sacrificial fibers may be used. The sacrificial fibers 14a can also have any suitable diameter such as about 5 μm to about 600 μm, such as about 10 μm to about 500 μm, and may have any suitable aspect ratio (length/width), such as about 10 to about 10,000, or about 20 to about 5,000. In certain embodiments, the sacrificial fibers 14a have an aspect ratio such that each sacrificial fiber traverses the substantial length or width of the ceramic preform 10 as continuous fibers.

As shown in FIG. 1a, in this embodiment, the sacrificial fibers 14a are disposed in a substantially parallel direction in relation to each other. The sacrificial fibers 14a may be disposed in various directions with respect to each other and may be disposed without a particular orientation, similar to a nonwoven. The sacrificial fibers 14a may be woven to form a woven mat or grid while forming the CMC preform 10 and/or may be woven prior to incorporation into the CMC preform 10. When used in a multidirectional weave or braid, the sacrificial fibers may be oriented both in-plane and out-of-plane.

The CMC preform 10 may be prepared in a variety of ways. In some embodiments, the reinforcing fibers 12 and the sacrificial fibers 14a may be introduced into the slurry 16 and any other additional desired components to form one or more plies.

In one embodiment, once the slurry is combined with the reinforcing fibers 12 and the sacrificial fibers 14a, the CMC preform 10 may be wound on a drum roll to form a tape and then cut into plies. One or more plies may be layered with the plies having various relative orientations. For instance, one or more plies may be cross-plied or layered directly over each other such that the fibers are oriented in the same direction. The configuration of the fibers in the tapes and the configuration of the plies may be modified depending on the desired CMC product and desired mechanical properties of the CMC product. In other embodiments, the slurry can be introduced to the fibers via tape casting, screen printing, or any other suitable method. The reinforcing fibers 12 and the sacrificial fibers 14a within the composite may be unidirectional, cross-woven, and/or nonwoven. The slurry 16 and method of introducing the slurry 16 to the reinforcing fibers 12 and the sacrificial fibers 14a may be modified depending on the orientation of the reinforcing fibers 12 and the sacrificial fibers 14a.

Figure 1B:
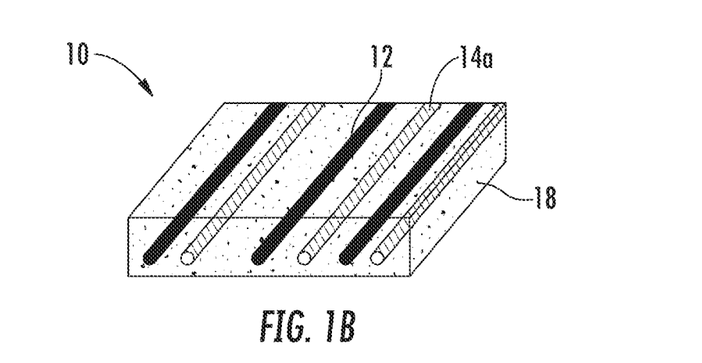
FIG. 1B is a schematic view of a CMC preform after heating and compacting the preform in accordance with one embodiment of the present disclosure.

FIG. 1b illustrates a CMC preform 10 after heating the preform. The preform may also be compacted. The CMC preform 10 includes reinforcing fibers 12, sacrificial fibers 14a, and matrix precursor material 18. The heat and/or compacting action removes some or all of the solvent of the slurry 16 leaving the matrix precursor material 18 of the slurry 16. The sacrificial fibers 14a are prepared such that the sacrificial fibers 14a are stable during the heating and compacting stage. For instance, the heating and compacting stage may be performed at a temperature of about 200° C. or less.

The sacrificial fibers 14*a* may be included in various amounts relative to the CMC preform 10. For instance, the sacrificial fibers 14*a* may be included in an amount of about 0.1% by volume to about 20% by volume, such as about 1% by volume to about 15% by volume, about 1% by volume to about 10% by volume, or about 1% by volume to about 7% by volume of the CMC preform.

Figure 1C:
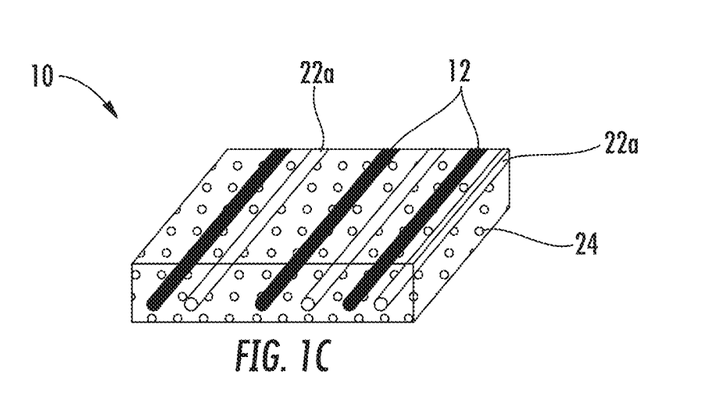
FIG. 1C is a schematic view of a CMC preform after removing some or all of the sacrificial fibers in accordance with one embodiment of the present disclosure.

FIG. 1*c* illustrates an exemplary CMC preform 10 after decomposing some or all of the sacrificial fibers 14*a*. Decomposition of some or all of the sacrificial fibers 14*a* results in the formation of elongate channels 22*a* throughout the CMC preform 10. Some or all of the matrix precursor material 18 may also be decomposed forming pores 24 in the CMC preform 10. In the embodiment illustrated in FIG. 1*c*, pores 24 are disposed throughout the CMC preform 10. The distribution of the pores 24 may vary and may be controlled to provide the desired porosity in the CMC preform 10. Decomposition may occur at temperatures of about 200° C. to about 700° C., such as about 200° C. to about 650° C., or about 400° C. to about 600° C. The decomposition atmosphere may be oxidizing, reducing, inert, or vacuum. The reinforcing fibers 12 are maintained in the CMC product.

The elongate channels 22*a* are generally continuous hollow channels formed in the CMC preform 10. Depending on the degree of decomposition of the sacrificial fibers 14*a*, the elongate channels 22*a* may have various amounts of scaffolding throughout the channels. For instance, with higher char yield polymers, the elongate channels 22*a* may have more scaffolding while with lower char yield polymers, the elongate channels 22*a* may have less scaffolding. The elongate channels 22*a* are sufficiently porous to allow the flow of infiltrant to fill the channels 22*a*, and may generally be considered cylindrical hollow channels with a higher length than diameter/width. When substantially all of the sacrificial fibers 14*a* decompose, the elongate channels 22*a* may have substantially the same size and distributions (for example, the same volume % and aspect ratio) as that of the sacrificial fibers 14*a*.

Figure 1D:
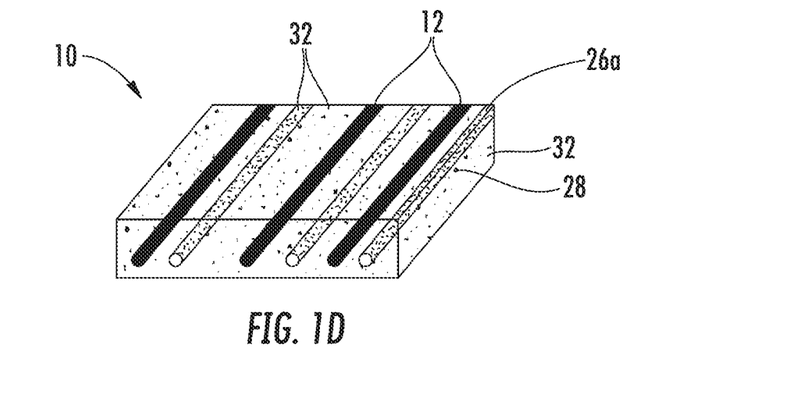
FIG. 1D is a schematic view of a CMC preform after infiltration of an infiltrant in accordance with one embodiment of the present disclosure.

FIG. 1*d* illustrates a CMC preform 10 after infiltration of an infiltrant 32. The infiltrant 32 fills pores 24 in the preform 10 forming an infiltrated matrix 28 and fills the elongate channels 22*a* forming infiltrated channels 26*a*.

The infiltrant 32 may be disposed in the pores 24 and channels 26*a* to increase the density of the final CMC product. The infiltrant 32 can be any of the various materials used in ceramic matrix composite processing. Examples of suitable infiltrants include molten material, such as silicon or silicon alloy, for melt infiltration or gaseous material, such as methyltrichlorosilane, for chemical vapor infiltration.

Figure 1E:
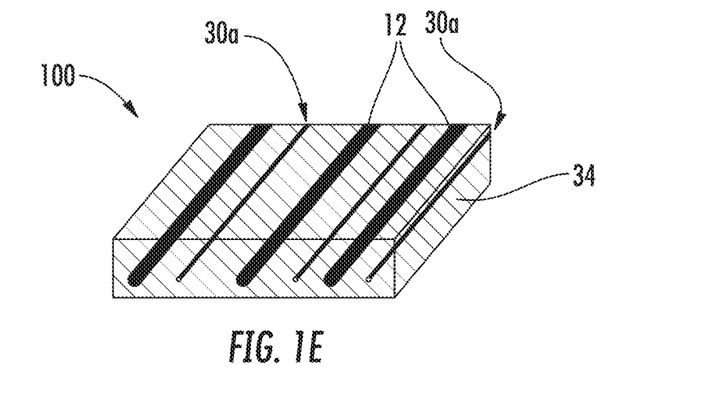
FIG. 1E is a schematic view of a CMC product in accordance with one embodiment of the present disclosure.

FIG. 1*e* illustrates the final CMC product 100. Infiltration of the CMC preform 10 with the infiltrant forms a densified CMC product 100. In some embodiments, multiple infiltration stages may be performed to obtain the CMC product 100. In chemical vapor infiltration, the gaseous material infiltrates the CMC preform 10 and reacts to form ceramic material, such as silicon carbide. After infiltration, the CMC product 100 may be further densified, heated to anneal, cooled, machined, inspected, or combinations thereof. In some embodiments, an external coating may be applied. The CMC product 100 includes ceramic matrix material 34 ("a ceramic matrix"), reinforcing fibers 12, and one or more infiltrant veins 30*a* disposed along the CMC product 100. The infiltrant veins 30*a* may be formed by unreacted infiltrant 32, such as silicon, remaining in the elongate channels 22*a*. For instance, in melt infiltration, unreacted infiltrant 32 may remain along the CMC product 100 as infiltrant veins 30*a*. In some embodiments, such as embodiments using chemical vapor infiltration, the infiltrant veins 30*a* may comprise a core and shell structure where the shell is reacted infiltrant and the core is a porous structure of that reacted infiltrant. For instance, the infiltrant veins 30*a* may comprise a shell of silicon carbide and a residual elongate pore at the core.

In some embodiments, as shown in FIG. 1*e*, the infiltrant veins 30*a* are disposed in a generally parallel pattern along the length/width of the CMC product 100. The infiltrant veins 30*a* are more regular and uniform than prior processes not using sacrificial fibers. In some embodiments, the CMC product comprises a plurality of infiltrant veins 30*a*, wherein the plurality of infiltrant veins 30*a* are elongate veins disposed in a grid pattern. Infiltrant veins 30*a* may be formed where some or all of the sacrificial fibers were disposed. That is, in some cases, an elongate channel may be completely reacted to ceramic material while some elongate channels may only partially react to ceramic material leaving infiltrant veins 30*a* along the CMC product 100. The size, distribution, and location of the sacrificial fibers 14*a* may be modified to control the formation and distribution of infiltrant veins 30*a* in the CMC product 100. For instance, the infiltrant veins 30*a* may have an aspect ratio of about 10 to about 10,000, such as about 20 to about 5,000. The infiltrant veins 30*a* may also comprise about 0.1% by volume to about 20% by volume, such as about 1% by volume to about 15% by volume, about 1% by volume to about 10% by volume, or about 1% by volume to about 7% by volume of the CMC product 100. In some embodiments, the infiltrant is molten silicon and the infiltrant veins 30*a* appear as free silicon content. The free silicon content may be from about 0.1% by volume to about 10% by volume of the CMC product, such as about 1% by volume to about 7% by volume.

In some embodiments, the sacrificial fibers may be disposed in a grid pattern to provide elongate channels across the CMC preform. For instance, the sacrificial fibers may be disposed in a woven grid pattern with sacrificial fibers disposed either in a perpendicular direction or a parallel direction. In certain other embodiments, the sacrificial fibers may be disposed in a nonwoven pattern. In such embodiments, it may be beneficial to have the sacrificial fibers fuse together at the intersections forming paths for the infiltrant to enter. FIGS. 2*a*-2*e* are schematic views of an exemplary method of forming a CMC product in accordance with one embodiment of the present disclosure. In particular, FIGS. 2*a*-2*e* illustrate various stages of forming a CMC product in accordance with one embodiment of the present disclosure where the sacrificial fibers are disposed in a grid pattern. Various combinations of these stages may be performed and not all of the stages may be performed in the method.

Figure 2A:
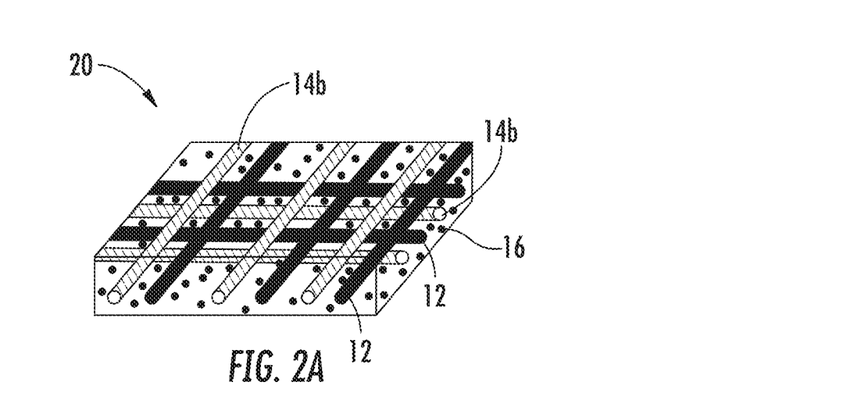
FIG. 2A is a schematic view of a CMC preform after forming with a slurry in accordance with one embodiment of the present disclosure.

FIG. 2*a* illustrates a CMC preform 20 after forming with a slurry 16. The CMC preform 20 includes reinforcing fibers 12, sacrificial fibers 14*b*, and a slurry 16. The CMC preform 20 illustrated in FIG. 2*a* may be considered a single ply (e.g., the sacrificial fibers 14*b* are layered in 0/90° with reinforcing fibers 12 in between). Multiple layers or "plies" may be used with each ply oriented in various directions as previously described (e.g., third, fourth, and fifth directions, etc.). While FIGS. 2*a*-2*e* show an embodiment with a single ply, the present method and materials can be used with a single unidirectional, cross-woven, or nonwoven ply, or multiple unidirectional, cross-woven, and/or nonwoven plies with alternating plies layered in a variety of orientations, or in multidirectional weaves or braids. For instance, in one embodiment, the sacrificial fibers may be in the form of a grid where the sacrificial fibers intersect one another. The sacrificial fibers 14b may be woven or configured in a first layer and a second layer, the first and second layers directly touching and in 0/90° configuration making a grid pattern. In other embodiments, the sacrificial fibers may form a continuous grid where the fibers fuse together at cross-sections forming a continuous grid in two dimensions in a single layer. The fibers may be cylindrical or otherwise and result in elongate channels on the same plane. Various configurations can be used without deviating from the intent of the present disclosure.

The slurry 16; reinforcing fibers 12; sacrificial fibers 14b; matrix precursor material 18; pores 24; infiltrant 32 and infiltrated channels, matrix, and veins; elongate channels 22b; and ceramic matrix material 34 as well as other components used in the embodiment illustrated in FIGS. 2a-2e may be any of those materials described herein (for example, with relation to FIGS. 1a-1e) with the accompanying characteristics.

In the embodiment illustrated in FIGS. 2a-2e, the sacrificial fibers 14b are disposed in a grid pattern. That is, the sacrificial fibers 14b are disposed to traverse both the length and width of the CMC preform 20 with some sacrificial fibers 14b disposed in a first direction traversing the length or width and a second set of sacrificial fibers 14b disposed in a second direction traversing the length or width, the second direction being perpendicular to the first direction. It may be desired to configure the sacrificial fibers 14b along the CMC preform 20 such that the sacrificial fibers 14b are throughout the preform. A grid pattern may be a suitable method of configuring the sacrificial fibers 14b, and may, in some cases, maximize the probability of melt infiltration success, while minimizing any mechanical/thermal property reduction.

The CMC preform 20 may be prepared in a variety of ways. In some embodiments, the reinforcing fibers 12 and the sacrificial fibers 14b may be introduced into the slurry 16 and any other additional desired components to form one or more plies. For instance, in some embodiments, it may be beneficial to include surfactants, dispersing agents, and/or other components in the slurry as well as matrix precursor material for the ceramic matrix.

In one embodiment, once the slurry is incorporated with the reinforcing fibers 12 and the sacrificial fibers 14b, the CMC preform 20 may be wound on a drum roll to form a tape and then cut into plies. One or more plies may be layered with the plies having various relative orientations. For instance, one or more plies may be cross-plied or layered directly over each other such that the fibers are oriented in the same direction. The configuration of the fibers in the tapes and the configuration of the plies may be modified depending on the desired CMC product and desired mechanical properties of the CMC product. In other embodiments, the slurry can be introduced to the fibers via tape casting, screen printing, or any other suitable method. The reinforcing fibers 12 and/or the sacrificial fibers 14b within the composite may be unidirectional, cross-woven, and/or nonwoven. The slurry 16 and method of introducing the slurry 16 to the reinforcing fibers 12 and the sacrificial fibers 14b may be modified depending on the orientation of the reinforcing fibers 12 and the sacrificial fibers 14b.

Figure 2B:
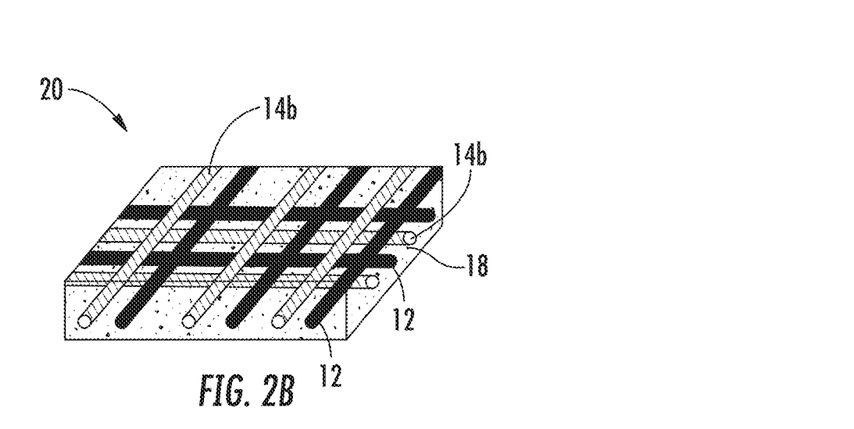
FIG. 2B is a schematic view of a CMC preform after heating and compacting the preform in accordance with one embodiment of the present disclosure.

FIG. 2b illustrates a CMC preform 20 after heating and compacting the preform. The CMC preform 20 includes reinforcing fibers 12, sacrificial fibers 14b, and matrix precursor material 18. The heat and compacting action removes some or all of the solvent of the slurry 16 leaving the matrix precursor material 18 of the slurry 16. The sacrificial fibers 14b are prepared such that the fibers are stable during the heating and compacting stage. For instance, the heating and compacting stage may be performed at a temperature of about 200° C. or less.

Figure 2C:
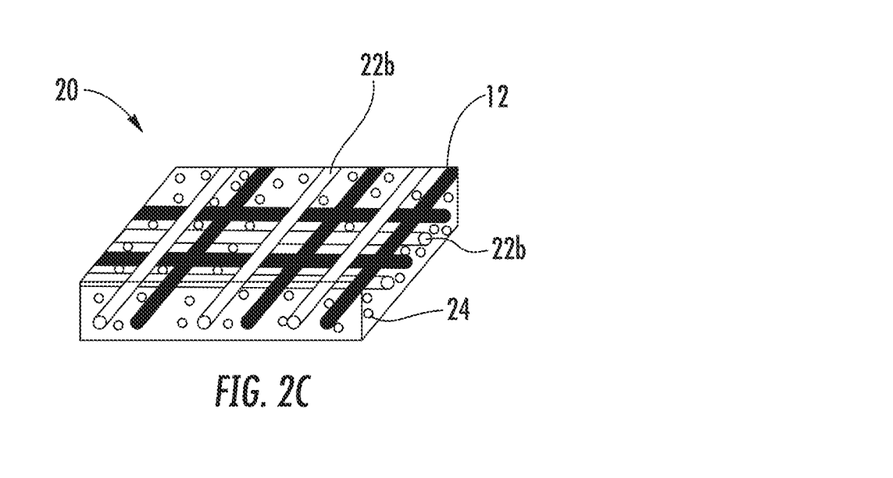
FIG. 2C is a schematic view of a CMC preform after removing some or all of the sacrificial fibers in accordance with one embodiment of the present disclosure.

FIG. 2c illustrates an exemplary CMC preform 20 after decomposing some or all of the sacrificial fibers 14b. Decomposition of some or all of the sacrificial fibers 14b results in the formation of elongate channels 22b throughout the ceramic preform 20. Some or all of the matrix precursor material 18 may also be decomposed forming pores 24 in the ceramic preform 20. In the embodiment illustrated in FIG. 2c, pores 24 are disposed throughout the ceramic preform 20. The distribution of the pores 24 may vary and may be controlled to provide the desired porosity in the CMC preform 20. Decomposition may occur at temperature of about 200° C. to about 700° C., such as about 200° C. to about 650° C., or about 400° C. to about 600° C. The reinforcing fibers 12 are maintained in the CMC product.

In the embodiment illustrated in FIG. 2c, the elongate channels 22b traverse the length and width of the CMC preform 20 such that subsequent infiltrant 32 may infiltrate the CMC preform 20 in both directions throughout the CMC preform 20. The elongate channels 22b may thereby provide paths for the infiltrant 32 to enter and fill the CMC preform 20 resulting in a product with increased density and thus improved mechanical properties.

Figure 2D:
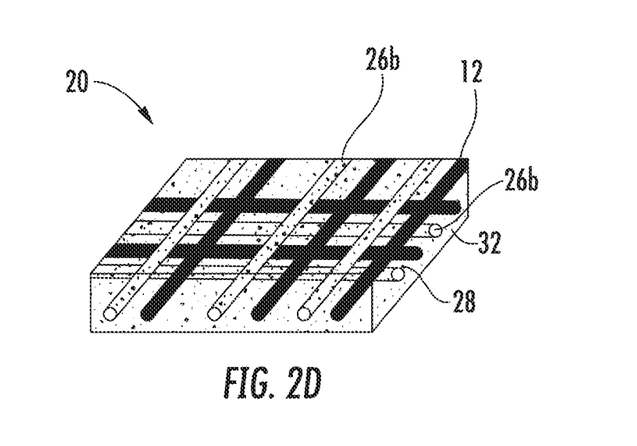
FIG. 2D is a schematic view of a CMC preform after infiltration of an infiltrant in accordance with one embodiment of the present disclosure.

FIG. 2d illustrates a CMC preform 20 after infiltration of an infiltrant 32. The infiltrant 32 fills pores 24 in the preform 20 forming an infiltrated matrix 28 and fills the elongate channels 22b forming infiltrated channels 26b.

The infiltrant 32 may be disposed in the pores 24 and channels 26b to increase the density of the final CMC product. The infiltrant 32 can be any of the various materials as described herein.

Figure 2E:
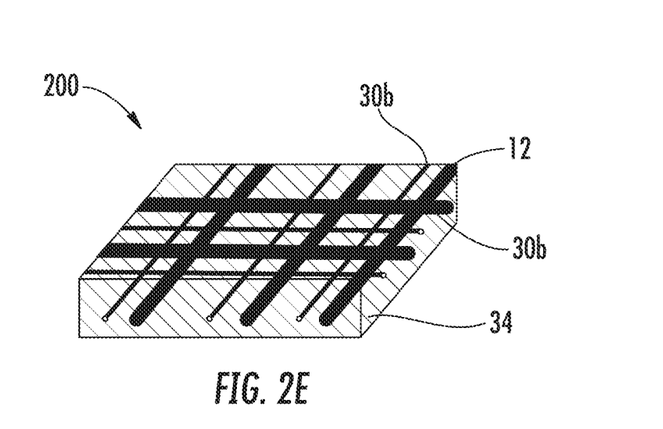
FIG. 2E is a schematic view of a CMC product in accordance with one embodiment of the present disclosure.

FIG. 2e illustrates the final CMC product 200. Infiltration of the CMC preform 20 with the infiltrant forms a densified CMC product 200. In some embodiments, multiple infiltration stages may be performed to obtain the CMC product 200. In chemical vapor infiltration, the gaseous material infiltrates the CMC preform 20 and reacts to form ceramic material, such as silicon carbide. After infiltration, the CMC product 200 may be further densified, heated to anneal, cooled, machined, inspected, or combinations thereof. In some embodiments, an external coating may be applied. The CMC product 200 includes ceramic matrix material 34 ("a ceramic matrix"), reinforcing fibers 12, and one or more infiltrant veins 30b disposed along the CMC product 200. The infiltrant veins 30b may be formed by unreacted infiltrant 32, such as silicon, remaining in the elongate channels 22b. For instance, in melt infiltration, unreacted infiltrant 32 may remain along the CMC product 200 as infiltrant veins 30b. In some embodiments, such as embodiments using chemical vapor infiltration, the infiltrant veins 30b may comprise a core and shell structure where the shell is reacted infiltrant and the core is a porous structure of that reacted infiltrant. For instance, the infiltrant veins 30b may comprise a shell of silicon carbide and a porous core of silicon carbide.

In some embodiments, as shown in FIG. 2e, the infiltrant veins 30b are disposed in a generally grid pattern following the grid pattern of the sacrificial fibers 14b. Infiltrant veins 30b may be formed where some or all of the sacrificial fibers were disposed. That is, in some cases, an elongate channel may be completely reacted to ceramic material while some elongate channels may only partially react to ceramic material leaving infiltrant veins 30b along the CMC product 200.

The size, distribution, and location of the sacrificial fibers 14b may be modified to control the formation and distribution of infiltrant veins 30b in the CMC product 200. The infiltrant veins 30b may be disposed along the CMC product 200 with the previously described aspect ratios and volume percent.

Figure 3:
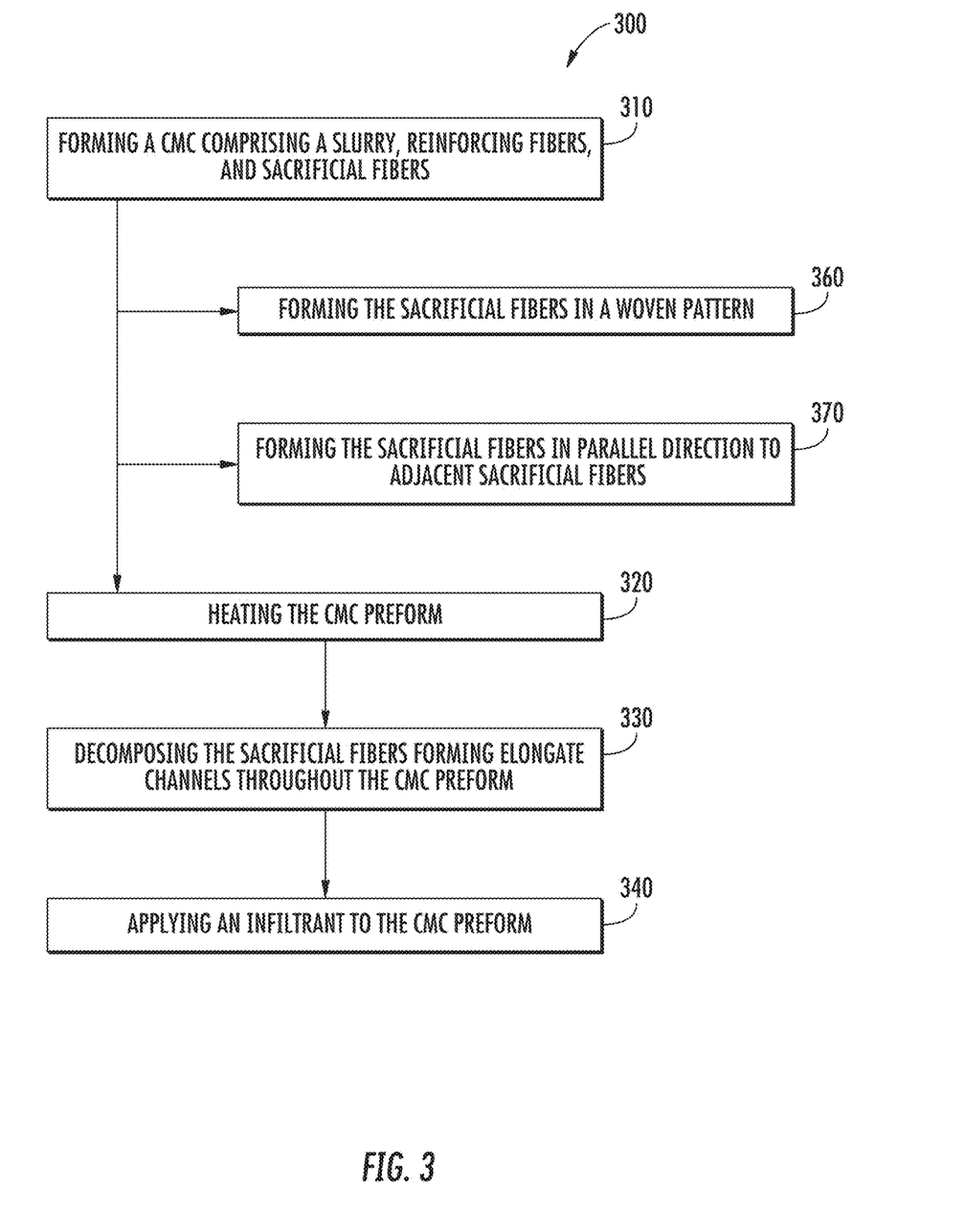
FIG. 3 is a flowchart of an exemplary method of forming a CMC product in accordance with one embodiment of the present disclosure.

FIG. 3 is a flowchart of an exemplary method of forming a CMC product in accordance with one embodiment of the present disclosure. The method 300 illustrated in FIG. 3 includes forming a CMC preform comprising a slurry, reinforcing fibers, and sacrificial fibers 310; heating the CMC preform 320, which may also include compacting the CMC preform; decomposing the sacrificial fibers forming elongate channels along the CMC preform 330; applying an infiltrant (such as a melt infiltrant or chemical vapor infiltrant) to the CMC preform 340; and thereby densifying the CMC preform forming a CMC product. The slurry, reinforcing fibers, sacrificial fibers, infiltrant, as well as other components used in the method 300 may be any of those described herein.

In some embodiments, forming the CMC preform comprises forming the sacrificial fibers in a woven pattern 360, while in some embodiments, forming the CMC preform comprises forming the sacrificial fibers in direction parallel to adjacent sacrificial fibers 370. The method 300 may include additional components or actions and may include repeating one or more of the previously described actions. Various alternative configurations of the method 300 may be used without deviating from the intent of the present disclosure. The CMC product may be further processed or machined as needed.

EXAMPLES

Figure 4:
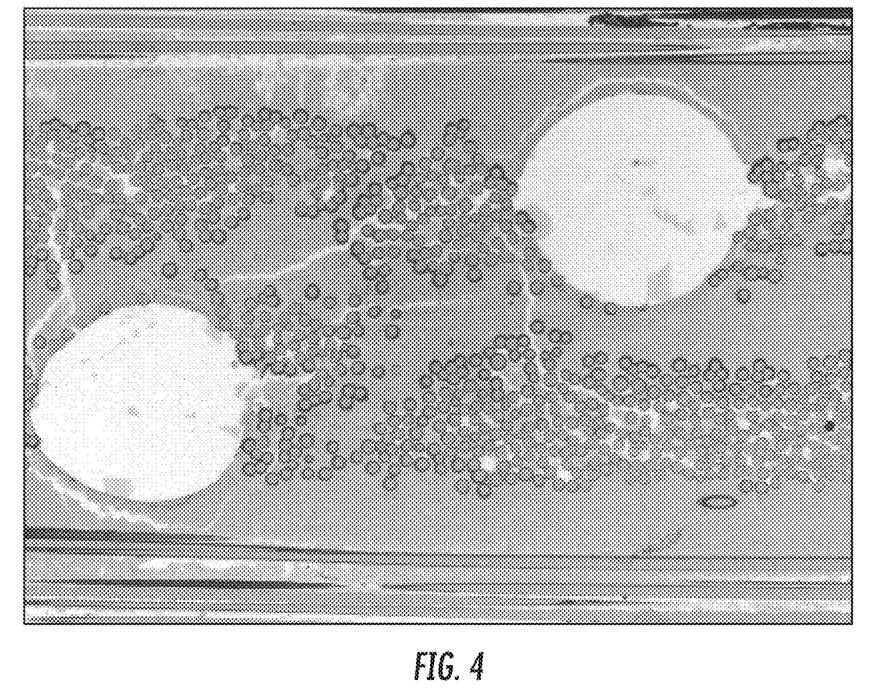
FIG. 4 is a micrograph showing the cross section of a CMC product in accordance with the Examples described below.

Nylon fibers (8 mils (203 μm) in diameter) with 50 mils (1.27 mm) spacing were wound into a prepeg ceramic tape. The tape was cut and layered in a 0/90 configuration panel. The panel was heated and compressed to remove solvent. The panel was then pyrolyzed to decompose the nylon fibers. Elongate channels traversing the panel were thereby formed in the tape. Melt infiltration of molten silicon was then used to infiltrate the elongate channels. Portions of the molten silicon reacted to form the ceramic matrix while portions of the silicon remained as unreacted silicon veins traversing the composite. FIG. 4 is a micrograph showing a portion of the cross section of the CMC product.

While the invention has been described in terms of one or more particular embodiments, it is apparent that other forms could be adopted by one skilled in the art. It is to be understood that the use of "comprising" in conjunction with the coating compositions described herein specifically discloses and includes the embodiments wherein the coating compositions "consist essentially of" the named components (i.e., contain the named components and no other components that significantly adversely affect the basic and novel features disclosed), and embodiments wherein the coating compositions "consist of" the named components (i.e., contain only the named components except for contaminants which are naturally and inevitably present in each of the named components).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of forming a ceramic matrix composite (CMC) product comprising:
   forming a CMC preform comprising a slurry, the slurry comprising ceramic reinforcing fibers and sacrificial fibers;
   removing the sacrificial fibers such that elongate channels are formed throughout the CMC preform;
   applying a fluid infiltrant to the CMC preform thereby densifying the CMC preform and forming the CMC product; and
   forming infiltrant veins in the CMC product, the infiltrant veins comprising unreacted infiltrant, wherein the unreacted infiltrant comprises free silicon and the free silicon is from about 0.1% by volume to about 10% by volume of the CMC product.

2. The method according to claim 1, wherein the fluid infiltrant comprises silicon or silicon alloy.

3. The method according to claim 1, wherein the fluid infiltrant comprises methyltrichlorosilane.

4. The method according to claim 1, wherein removing the sacrificial fibers comprises:
   heating the CMC preform to decompose the sacrificial fibers, wherein the sacrificial fibers are formed of material with a decomposition temperature of about 200° C. to about 650° C.

5. The method according to claim 1, wherein the sacrificial fibers comprise a semi-crystalline polymer, a crosslinked polymer, an amorphous polymer, or combinations thereof.

6. The method according to claim 1, wherein the sacrificial fibers comprise one or more of crosslinked phenolic resin, crosslinked poly(vinyl butyral), polyamides, polyesters, and combinations thereof.

7. The method according to claim 1, wherein the reinforcing fibers comprise one or more of carbon, silicon carbide, silicon nitride, silicon oxycarbides, silicon oxynitrides, silicides, aluminum oxide, silicon dioxide, yttrium aluminum garnet, aluminosilicates, zirconium carbide, hafnium carbide, carbon, SiNC, SiBNC, and boron carbide.

8. The method according to claim 1, wherein the CMC product comprises a ceramic matrix that comprises one or more of silicon carbide, silicon nitride, silicon oxycarbides, silicon oxynitrides, silicides, aluminum oxide, silicon dioxide, yttrium aluminum garnet, aluminosilicates, zirconium carbide, hafnium carbide, carbon, and boron carbide.

9. The method according to claim 1, wherein forming the CMC preform comprises forming the sacrificial fibers in a woven pattern.

10. The method according to claim 1, wherein forming the CMC preform comprises forming the sacrificial fibers in a parallel direction to adjacent sacrificial fibers within a ply.

11. The method according to claim 1, wherein sacrificial fibers are about 0.1% to about 15% by volume of the CMC preform, and wherein the sacrificial fibers have an average diameter of about 10 μm to about 500 μm.

12. The method according to claim 1, wherein the sacrificial fibers have an aspect ratio of about 10 to about 10,000.

13. The method according to claim 1, wherein the sacrificial fibers are continuous along a length or width of the CMC preform.

14. The method according to claim 1, wherein applying the infiltrant to the CMC preform comprises applying a melt infiltrant to fill the elongate channels throughout the CMC preform.

15. The method according to claim 1, wherein applying the infiltrant to the CMC preform comprises applying a chemical vapor infiltrant to fill the elongate channels throughout the CMC preform.

16. The method according to claim 1, wherein the reinforcing fibers have a diameter from about 5 μm to about 20 μm.

17. The method according to claim 1, wherein the reinforcing fibers have a diameter from about 125 μm to about 175 μm.

18. The method according to claim 1,
wherein removing the sacrificial fibers is done in an oxidizing, reducing, inert, or vacuum atmosphere.

19. A method of forming a ceramic matrix composite (CMC) product comprising:
forming a CMC preform comprising a slurry, the slurry comprising ceramic reinforcing fibers and sacrificial fibers, wherein the reinforcing fibers have a diameter from about 125 μm to about 175 μm;
removing the sacrificial fibers such that elongate channels are formed throughout the CMC preform;
applying a fluid infiltrant to the CMC preform thereby densifying the CMC preform and forming the CMC product; and
forming infiltrant veins in the CMC product, the infiltrant veins comprising unreacted infiltrant, wherein the unreacted infiltrant comprises free silicon and the free silicon is from about 0.1% by volume to about 10% by volume of the CMC product.

* * * * *